Dec. 16, 1947.　　　　E. F. FLINT　　　　2,432,875
LEVEL INDICATING DEVICE
Filed Sept. 1, 1942
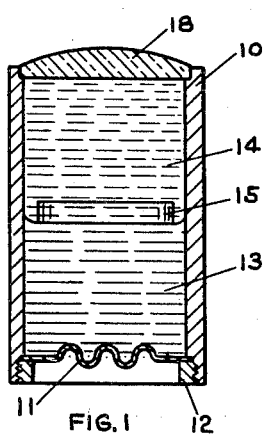
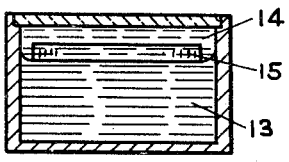
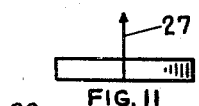
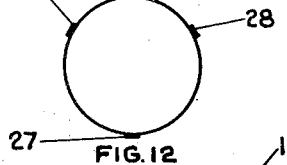
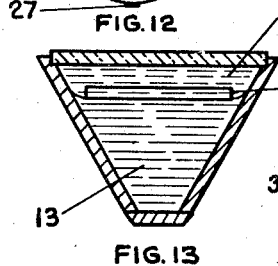
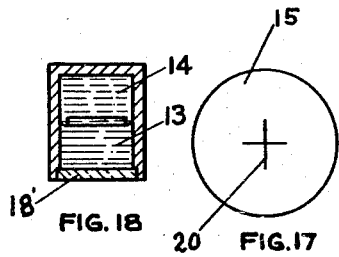
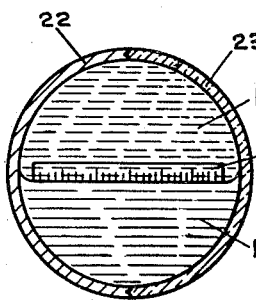
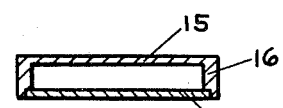
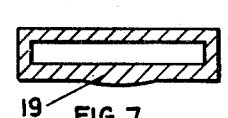
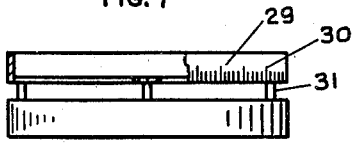
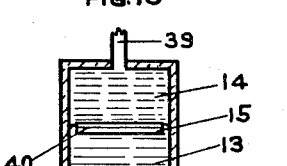
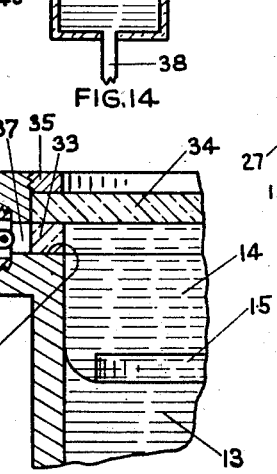
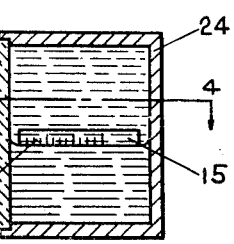
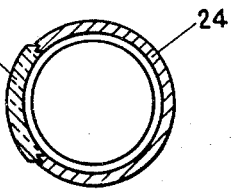
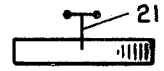
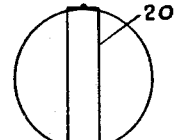
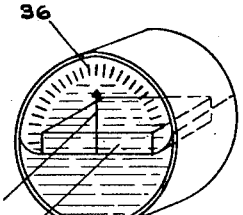
EDWARD F. FLINT
INVENTOR
BY
ATTORNEYS Patented Dec. 16, 1947

2,432,875

UNITED STATES PATENT OFFICE 2,432,875

LEVEL INDICATING DEVICE

Edward F. Flint, Rochester, N. Y., assignor to Bausch & Lomb Optical Company, Rochester, N. Y., a corporation of New York Application September 1, 1942, Serial No. 456,888

3 Claims. (Cl. 33—206)

This invention relates to indicating devices and more particularly to an indicating device in which one member is supported by a liquid.

As the device of the present invention may be employed in almost countless fields of use with slight modification to adapt it to a particular use, no effort has been made to enumerate all fields in which the device might be used, although several fields of use have been suggested.

In the broadest aspect thereof, the device of the present invention comprises a container or shell, having a transparent wall portion, filled with two immiscible liquids of different specific gravity and a member supported by the heavier of the liquids, the lighter liquid damping movement of the heavier liquid and the member supported thereby. Any two liquids desired may be used which are immiscible and of different specific gravities, although for some applications of the device certain liquids will be more desirable than others.

While the relative quantities of the two liquids used may vary in different fields of use, in the now preferred embodiment of the device, the container is charged with equal volumes of the liquids.

The specific gravity of the member should be somewhat greater than the lighter of the liquids and less than the heavier so that it will be supported by the heavier of the liquids. The container is completely charged with the liquids so that each liquid damps the other and as the member is entirely surrounded by the liquids, movement of the same from a mean position is held to a minimum.

As the supported member is to carry means for cooperation with some suitable index or fiducial means spaced from said member, at least the liquid adjacent to the transparent wall portion should be sufficiently limpid to permit the light rays to pass therethrough.

The transparent wall portion of the container may be disposed on that surface of the wall most convenient in the particular use to which the device is being put. For this reason, either liquid may be transparent and the means cooperative with the fiducial means will be disposed on or carried by that surface of the supported member contiguous to the transparent liquid.

As it is desirable to have the means of the member at all times visible through the transparent wall portion of the container, the member should be so constructed that the center of gravity thereof will be displaced from the actual center of the same so that the member will tend to assume one position relative to the transparent wall portion of the container.

The meniscus formed at the contacting surfaces of the two liquids is used in the present invention to position the supported member relative to the walls of the container. The member should be of such size and shape relative to the size and shape of the container that the meniscus formed between the member and the side wall of the container will be sufficient to center the member relative to the inner walls of the container.

Other objects and advantages will appear from the following description taken in connection with the accompanying drawings in which:

Fig. 1 is a vertical section of one form of the device of the present invention, with the supported member being shown in elevation.

Fig. 2 is a view similar to Fig. 1, but showing a modified form of the device of the present invention.

Fig. 3 is a sectional view partly in elevation of another form of the device of the present invention.

Fig. 4 is a section taken along line 4—4 of Fig. 3.

Fig. 5 is a further modified form of the device of the present invention.

Fig. 6 is a sectional view of one form of the supported member of the present invention.

Fig. 7 is a view similar to Fig. 6, but showing a modified form of the supported member.

Fig. 8 is an elevational view of a supported member showing one form of an index means which can be used with the device of the present invention.

Fig. 9 is a top plan view of the member shown in Fig. 8.

Fig. 10 is an elevational view shown partly in section of another form of index means.

Fig. 11 is a view similar to Fig. 8 but showing a still further type of index means.

Fig. 12 is a top plan view of the member shown by Fig. 11.

Fig. 13 is a view similar to Fig. 1, but showing a still further modified form of the device of the present invention.

Fig. 14 is a vertical sectional view of another form of the device of the present invention.

Fig. 15 is a perspective view of yet another form of the device of the present invention.

Fig. 16 is a fragmentary sectional view showing a means for illuminating the interior of the container of the device of the present invention.

Fig. 17 is a top plan view showing yet a still further form of the supported member of the present invention.

Fig. 18 in a view similar to Fig. 1 but showing a still further form of the device of the present invention.

In the form of the invention shown in Fig. 1, the container or cell 10 comprises a tubular body having one end closed by a corrugated flexible wall 11 held in place across the open end of the body by a locking ring 12 threaded into the end of the same. The container carries two liquids 13 and 14 which are immiscible and in this form of the device of the present invention, liquid 13 has a specific gravity greater than liquid 14.

The liquids may comprise any two immiscible liquids desired of different specific gravities, although the use intended for the device must be considered in the selection of the liquids. If the device, for instance, was to be used where the ambient temperature would be less than the freezing temperature of water, the liquids would have to have a freezing temperature less than water and one sufficiently low to make their use in that application of the device practical. Although the corrugated wall 11 will allow some expansion and contraction, liquids are preferred which have a low coefficient of expansion.

The container houses a shell-like member 15 having a specific gravity greater than the liquid 14 but less than liquid 13 so that the same is supported by the latter liquid. The shell, as best shown in Fig. 6, may comprise a cup-shaped member 16, the one open end of which is closed by a disc 17. The position in which the member will be supported on the liquid can be determined by the location of the center of gravity of the same. The center of gravity of the member may be varied by forming the disc 17 of materials having varying specific gravities so that if the disc 17 is made of a material having a specific gravity greater than the material of the member 16, the center of gravity of the shell will be closer to the disc 17 than the opposite wall. Thus when supported by the liquid 13, the shell will tend to maintain a position in which the disc 17 will be in contact with the heavier liquid.

This is of particular importance in the embodiment of the device such as shown in Fig. 1 where the upper end of the container is closed by a transparent wall 18. In such embodiments of the device, the upper liquid is transparent and it is important that a selected surface of the member 15 or some means carried by or supported above to that surface, will be always visible from a position adjacent the outer surface of the transparent closing wall 18.

The member need not be formed of two different materials but may be formed of a single material as shown in Fig. 7, wherein the center of gravity is displaced from the actual center of the shell by thickening the lower wall as shown at 19 in Fig. 7.

The means carried by the surface of the shell facing the transparent wall 18 may comprise any means desired for effecting a given purpose. The device of the present invention finds particular utility in instruments or the like in which measurements or other determinations are made in reference to a datum plane, line or point for the member 15 or some means thereon can be used to fix the datum reference.

The surface of the shell facing the transparent wall 18 may be coated with a reflecting film so that an image of a fiducial means located in a superimposed position with respect to the shell will be formed and which may be aligned with some other correlated means. This form of the device lends itself to instruments such as optical levers for measuring small movements.

If desired the transparent closing wall 18 may comprise a lens having such a surface that it will project an image of the fiducial means to some predetermined position relative to the cell or container.

The means carried by the member 15 may comprise as shown in Fig. 17 a reticle 20 comprising cross hairs formed on or carried by the upper surface of the member or the recticle 20 may comprise as shown in Figs. 8 and 9, a pair of hairs supported above the surface by small stanchions 21 carried by the member 15 at diametrically opposite points thereon.

In some applications of the device it will be desirable to form the lower wall of transparent material such as shown at 18' in Fig. 18. In this form of the device, at least the heavier liquid 13 will be transparent.

In certain embodiments of the device of the present invention such as shown in Fig. 2, the container 22 may be spherical. In this form of the device the transparent wall portion 23 is semi-spherical and, if desired or necessary, a corrective lens may be employed to eliminate the distorted image formed by the spherical wall.

In Figs. 3 and 4 the container 24 is cylindrical but differs from the container 10 shown in Fig. 1, for in this form of the device the transparent wall portion comprises a transparent cylindrical insert 25 sealed in an opening formed in the wall of the container. The index means in this form of the invention, as well as in other forms, may comprise as shown suitable scale indicia 26 cooperative with a fiducial means (not shown) etched or permanently secured to the transparent wall portion of the container. In this embodiment of the device, as well as that shown in Fig. 2, the scale indicia may be carried by the transparent wall portion and the fiducial means, such as the indicator 27 of Figs. 11 and 15, can be carried by the member 15. Where the member 15 carries an indicator such as 27, a plurality of small weights 28 should be spaced about the lower wall of the member to counteract or compensate for the weight of the indicator.

Containers such as shown in Figs. 2, 3, 4 and 15 may be used, for instance, to indicate or measure the amount of inclination of a member from the horizontal plane determined by the shell 15.

If desired, the member 15 may carry, as shown in Fig. 10, a band 29 carrying scale indicia 30. The band 29 is preferably supported above the upper surface of the member 15 by means of small posts 31. If, in the use of the device, particles of the heavier liquid were to be rocked onto the face of the member, they can roll off the same through the space provided between the band 29 and the upper surface of the member.

The quantity of each liquid to be contained within the container may vary, although it has been found that for most uses the device is more efficient if the container is charged with substantially equal volumes of the two liquids. In some applications, however, it may be desired to use unequal quantities of the two liquids. In the device shown in Figs. 5 and 13, a relatively small amount of the transparent liquid 14 is used while a relatively larger quantity of the denser liquid 13 is carried by the containers.

Although the container need not be completely charged with the two liquids, it has been found that the movement of the member is considerably reduced when the container is completely filled. This is particularly true where the device is subject to acceleration or deceleration for the liquids if they do not completely fill the container tend to surge against the leading or trailing wall of the container depending upon whether the container is being accelerated or decelerated. If the container is completely charged with the liquids, acceleration or deceleration has very little effect on the member.

In some fields of use, it may be desired to illuminate the index or other indicia means carried by the member 15. This member may be illuminated by any means desired and in Fig. 16, there is shown one method of illuminating the member. In this embodiment of the device of the present invention, the container is formed with a seat 32 for taking an annular light transmitting member 33. The light transmitting member 33 is held on the seat 32 by a transparent end closing wall 34 locked in place by a ring 35 threaded into the open end of the container. A small incandescent lamp 36 is threaded into a socket formed in the side wall of the container which is connected by a light passage 37 to the light transmitting member 33. The member 33 is formed of some material such as Lucite for distributing the light from the lamp 36 about the upper end of the container. The light is sufficient to illuminate the interior of the container and the index or fiducial means carried by or disposed on the member 15.

In all forms of the device of the present invention, the meniscus formed at the adjoining or adjacent surfaces of the two liquids is used to space the member 15 from the wall of the container.

In the now preferred form of the invention, the liquid 13 is one which will wet the wall of the container and form a concave meniscus. The member 15 should be of such size and shape relative to the size and shape of the container that it will be spaced from the wall of the same by the meniscus formed. The meniscus is sufficient to keep the member away from the wall when the member is supported by the liquid in the form of the invention shown in Fig. 1, as well as in the form of the invention shown in Fig. 14, where a convex meniscus is formed and the member 15 is substantially submerged in the liquid 13.

In the form of the device shown in Fig. 14, although the member is substantially surrounded by the heavier liquid 13 yet the lighter liquid 14 damps movement of the member 15.

Although it would appear that the meniscus would be more efficient where the wall of the member 15 is parallel with the inner surface of the wall of the container, as where the member is cylindrical and the container either spherical or cylindrical, yet I have found that the meniscus will hold a square member such as shown in Fig. 15, away from and out of contact with the inner surface of the wall of the container. Furthermore, the meniscus will center a member such as that illustrated in Fig. 15 relative to the wall of the container if the member is of a size slightly smaller than the distance between the inner surface of the wall. Therefore, the member 15 may be made in any shape and form desired as long as the specific gravity thereof is less than that of the supporting liquid and the overall size thereof is somewhat smaller than the distance between the inner surfaces of the wall.

As the particular shape of the member 15 plays little part in the device of the present invention, the container, as shown in a number of the figures of the drawing, may be made of any shape or form desired to fit a particular application of the invention.

The container need not be a metallic one having a transparent wall portion but may be entirely formed of a transparent material such as the float gage shown in Fig. 14. In this form of the invention, an inlet tube 38 is connected to the lower portion of the container or that portion carrying the heavier liquid 13 while an outlet tube 39 leads from the upper portion of the container to some other portion of the mechanism with which the float gage is being used. The member 15 in this embodiment of the invention carries an index line 40 for cooperation with a suitable scale (not shown) formed on the transparent wall of the container.

While several embodiments of the device of the present invention have been disclosed, it is to be understood that the invention need not be limited to the embodiments shown and described but is susceptible of modifications falling within the spirit of the invention and the scope of the appended claims.

Although a fiducial or like means has not been shown as carried by either the container or the member 15 in all illustrated embodiments of the invention, it is to be understood that member 15 carries means cooperable with a fiducial or other indicia means spaced from the member and not necessarily fixed to the container.

I claim:

1. A device of the type described comprising a container having a transparent wall portion, two immiscible liquids of different specific gravities carried in said container, one of the liquids being transparent and in contact with said wall portion, a member supported by the liquids and having a surface resting on the upper surface of the heavier liquid, said heavier liquid forming a meniscus with the inner wall of the container, said meniscus serving as the sole means for spacing the member from the wall, said member carrying indicia which are visible through the transparent liquid and said wall portion.

2. A device of the type described comprising a container having a transparent wall portion, two immiscible liquids of different specific gravities carried in contact with each other in said container, one of the liquids being transparent and in contact with said wall portion, a member supported by the liquids and having a substantially flat lower surface contacting the upper surface of the heavier liquid and supported thereby, the remaining surfaces of the member being in contact with the lighter liquid, said heavier liquid forming a concave meniscus with the inner wall of the container, said meniscus serving as the sole means for spacing the member away from the wall, said member carrying indicia which are visible through the transparent liquid and said wall portion.

3. A device of the type described comprising a sealed container having a transparent wall portion, two immiscible liquids of different specific gravities carried in contact with each other in said container, at least one of the liquids being transparent and in contact with said wall portion, a member supported by the liquids and having a lower surface resting on the upper surface of the heavier liquid, said heavier liquid forming a concave meniscus with the inner wall of the container, said meniscus serving as the sole means to keep the member spaced from the wall of the container, said member carrying indicia, the center of gravity of the member being located so as to normally maintain the indicia in contact with the transparent liquid whereby the indicia are visible through the transparent liquid and said wall portion.

EDWARD F. FLINT.

REFERENCES CITED

The following references are of record in the file of this patent:

UNITED STATES PATENTS

| Number | Name | Date |
|---|---|---|
| 1,396,155 | Bartlette et al. | Nov. 8, 1921 |
| 1,092,966 | Wilkinson | Apr. 14, 1914 |
| 2,279,254 | Irwin | Apr. 7, 1942 |
| 1,344,663 | Waldrip | June 29, 1920 |
| 1,754,055 | Senter | Apr. 8, 1930 |
| 2,098,241 | Hegenberger et al. | Nov. 9, 1937 |
| 2,153,565 | Isaacson | Apr. 11, 1939 |
| 1,912,358 | Bush | June 6, 1933 |
| 2,078,977 | Samiron | May 4, 1937 |
| 1,957,897 | Micek | May 8, 1934 |
| 1,397,490 | Perdatto | Nov. 15, 1921 |

FOREIGN PATENTS

| Number | Country | Date |
|---|---|---|
| 160,017 | Germany | Apr. 27, 1905 |
| 490,127 | Germany | Jan. 24, 1930 |
| 449,985 | France | Jan. 7, 1913 |
| 263,414 | Germany | Aug. 8, 1913 |
| 152,488 | Great Britain | Sept. 10, 1919 |
| 128,959 | Germany | Dec. 25, 1900 |
| 502,272 | Germany | July 11, 1930 |